United States Patent
Delaporte

(10) Patent No.: US 12,158,782 B2
(45) Date of Patent: Dec. 3, 2024

(54) 360 DEGREE CAMERA FUNCTIONS THROUGH A FOLDABLE MOBILE DEVICE

(71) Applicant: Lepton Computing LLC, Brooklyn, NY (US)

(72) Inventor: Stephen E. Delaporte, Brooklyn, NY (US)

(73) Assignee: Lepton Computing LLC, Brooklyn, NY (US)

( * ) Notice: Subject to any disclaimer, the term of this patent is extended or adjusted under 35 U.S.C. 154(b) by 0 days.

(21) Appl. No.: 17/521,838

(22) Filed: Nov. 8, 2021

(65) Prior Publication Data
US 2022/0197351 A1 Jun. 23, 2022

Related U.S. Application Data

(60) Provisional application No. 63/111,058, filed on Nov. 8, 2020.

(51) Int. Cl.
| | |
|---|---|
| *H04N 23/51* | (2023.01) |
| *G06F 1/16* | (2006.01) |
| *G06F 3/0488* | (2022.01) |
| *H04N 23/45* | (2023.01) |
| *H04N 23/53* | (2023.01) |

(52) U.S. Cl.
CPC .......... *G06F 1/1686* (2013.01); *G06F 1/1616* (2013.01); *G06F 1/1652* (2013.01);
(Continued)

(58) Field of Classification Search
CPC ........ G06F 1/1616–162; G06F 1/1652; H04N 5/22525; H04N 5/225251; H04N 23/53;
(Continued)

(56) References Cited

U.S. PATENT DOCUMENTS

| | | | |
|---|---|---|---|
| 11,042,190 B1 * | 6/2021 | Chen | A63F 13/92 |
| 2014/0285618 A1 * | 9/2014 | Cho | H04N 23/631 |
| | | | 348/38 |

(Continued)

FOREIGN PATENT DOCUMENTS

CN 107770477 B * 9/2019 ............. H04N 7/142

*Primary Examiner* — Paul M Berardesca
(74) *Attorney, Agent, or Firm* — ArentFox Schiff LLP; Joseph M. Maraia

(57) ABSTRACT

A foldable touch screen display device made up of flexible or tiled display segments that can be folded from a compact state to an expanded state which also includes a 360 degree camera system. The form factor of the compact state is roughly the size of a typical handheld phone or smaller. The form factor of the expanded state is roughly the size of a larger phone or tablet computer, which may also include the mechanical functionality of a laptop. The device form factor may also be a flip phone configuration. Both folded states may include an integrated speaker and microphone. The 360 degree camera utilizes the inherent folded segment positions and their respective cameras such that they can be configured at different angles to achieve the appropriate camera array geometry. The device may further include sensors to indicate the position of each display segment. In one embodiment, a module attached to, situated within, or otherwise associated with at least one segment of the flexible display or rigid display may contain all or substantially all processing and memory, along with a communications system, which may be used in any folded state.

10 Claims, 4 Drawing Sheets

(52) U.S. Cl.
CPC ........... *G06F 3/0488* (2013.01); *H04N 23/45* (2023.01); *H04N 23/51* (2023.01); *H04N 23/53* (2023.01)

(58) Field of Classification Search
CPC .... H04N 23/531; H04N 5/2258; H04N 5/247; H04N 23/45; H04N 23/80; H04N 23/90; H04N 23/957; H04N 13/282; H04N 23/50; H04N 23/51; H04N 23/57; H04M 1/0268; H04M 1/0269; H04M 1/0264
See application file for complete search history.

(56) References Cited

U.S. PATENT DOCUMENTS

| | | | |
|---|---|---|---|
| 2015/0195926 A1* | 7/2015 | Kandur Raja | H04N 23/45 361/679.21 |
| 2016/0050408 A1* | 2/2016 | Lee | H04N 23/90 348/47 |
| 2018/0324356 A1* | 11/2018 | Sarraju | H04N 23/57 |
| 2018/0332205 A1* | 11/2018 | Hawthorne | H04N 13/257 |
| 2020/0081227 A1* | 3/2020 | Huang | H04N 23/45 |
| 2020/0326754 A1* | 10/2020 | Kim | G09F 9/301 |
| 2021/0021768 A1* | 1/2021 | Tong | H04N 23/90 |
| 2021/0124389 A1* | 4/2021 | NakaMats | G06F 1/1647 |
| 2021/0136284 A1* | 5/2021 | Gopalakrishna | H04N 23/75 |
| 2021/0157370 A1* | 5/2021 | Tam | G06F 1/1686 |
| 2021/0368099 A1* | 11/2021 | Nguyen | H04N 23/698 |
| 2022/0050425 A1* | 2/2022 | Connor | G04G 21/02 |
| 2022/0385814 A1* | 12/2022 | Hwang | H04N 23/80 |
| 2023/0138495 A1* | 5/2023 | Ma | H04N 23/632 |

\* cited by examiner

360 DEGREE CAMERA FUNCTIONS THROUGH A FOLDABLE MOBILE DEVICE

CROSS REFERENCE TO RELATED APPLICATIONS

This application claims the benefit of U.S. Provisional Patent Application No. 63/111,058, filed on Nov. 8, 2020, which is incorporated in its entirety herein by reference.

FIELD OF THE INVENTION

The present invention relates generally to computing devices, and more particularly, to a computing device with a touch screen display that can be folded from a compact state to an expanded state.

BACKGROUND OF THE INVENTION

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

One of the great difficulties in using a small-scale touch screen device, however, is in the fact that it can often be cumbersome to physically interact with. This is especially apparent when selecting and manipulating features and inputting text, which can sometimes be imprecise for a user. In such handheld computing devices as a touch screen mobile phone, the limited size of the display can also significantly reduce the viewing capacity while watching videos, using graphic intensive applications, and reading text. The rigid nature of a standard touch screen display can also limit the portability of a device when its form factor is in the larger size range for a phone, or at the scale of a tablet, which makes folding a desirable feature. Additionally, because a foldable device fundamentally has segments with multiple embedded cameras that can be positioned at different angles, leveraging the capacity of these cameras to implement other kinds of image capture techniques is not fully maximized.

There is therefore a need for touch screen display devices that can be adjusted in size without sacrificing the convenience of being small and handheld. There is also a need for a 360 degree camera that utilizes the inherent folded segment positions and their respective cameras such that they can be configured at different angles to achieve the appropriate camera array geometry to generate 360 degree images and videos.

SUMMARY OF EMBODIMENTS OF THE INVENTION

A foldable touch screen display device made up of flexible or tiled display segments that can be folded from a compact state to an expanded state which also includes a 360 degree camera system. The form factor of the compact state is roughly the size of a typical handheld phone or smaller. The form factor of the expanded state is roughly the size of a larger phone or tablet computer, which may also include the mechanical functionality of a laptop. The device form factor may also be a flip phone configuration. Both folded states may include an integrated speaker and microphone. The 360 degree camera utilizes the inherent folded segment positions and their respective cameras such that they can be configured at different angles to achieve the appropriate camera array geometry. The device may further include sensors to indicate the position of each display segment. In one embodiment, a module attached to, situated within, or otherwise associated with at least one segment of the flexible display or rigid display may contain all or substantially all processing and memory, along with a communications system, which may be used in any folded state.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence.

Additionally, some of the described method embodiments or elements thereof can occur or be performed simultaneously, at the same point in time, or concurrently.

Figure 1:
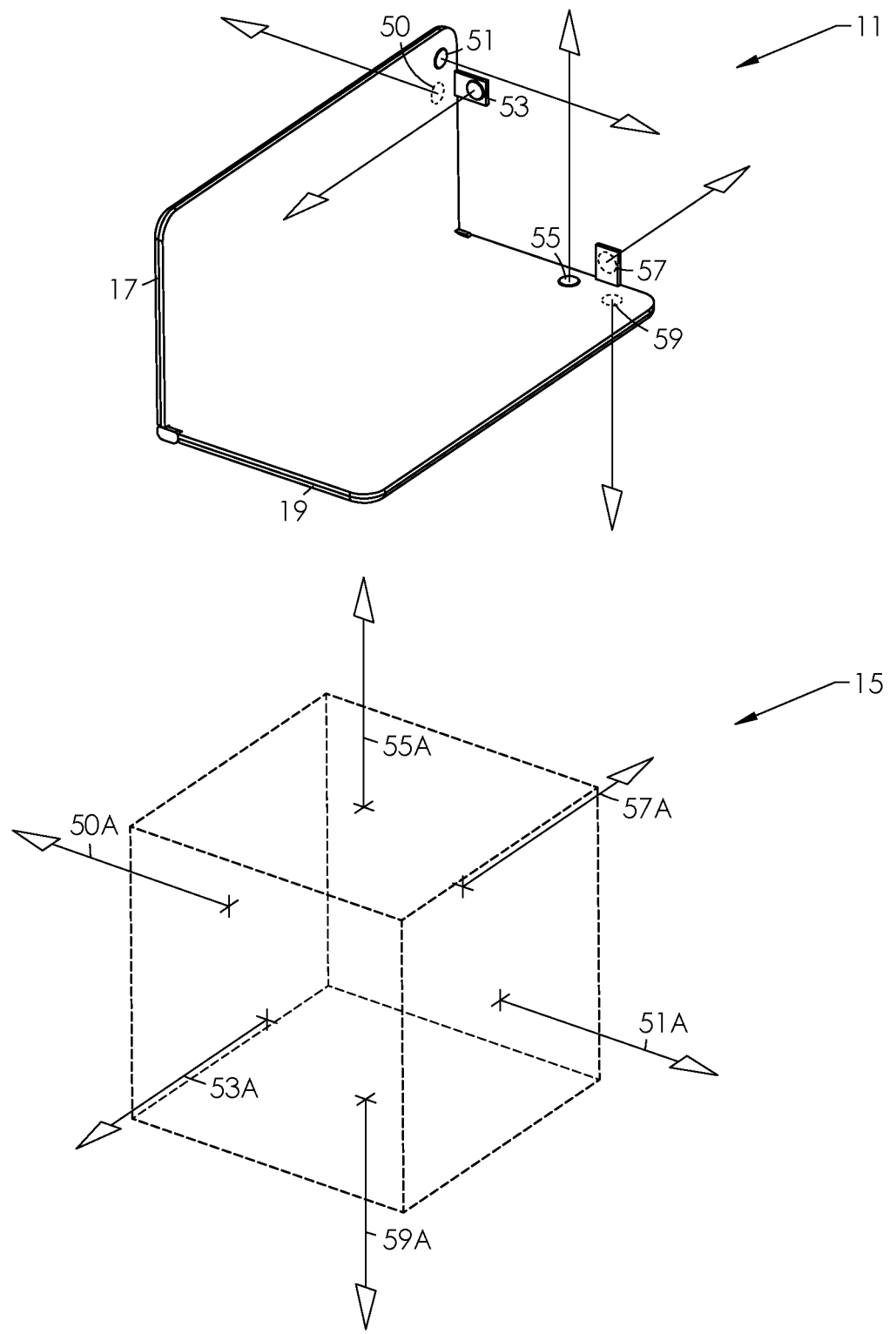
FIG. 1 is a perspective view of a foldable computing device shown in a configuration where 6 cameras are used to create a 360 degree camera with a reference to the 6 faces of a cube.

In accordance with the exemplary embodiment shown in FIG. 1, a foldable computing device 11 is shown in a configuration where 6 cameras 50, 51, 53, 55, 57, and 59 are used to create a 360 degree camera. Each camera faces a different direction to achieve a 360 degree array, including up, down, left, right, front, and back, and in this particular configuration, the 6 cameras are configured similar to how the faces of a cube are arranged, which is referenced with its 6 faces in diagram 15 shown below foldable mobile device 11. This includes each face and the direction the camera affiliated with each face is pointing in, including 50A, 51A, 53A, SSA, 57 A, and 59A. Camera 50 from foldable computing device 11 points in direction 50A, while camera 51 points in direction 51A. Similarly, camera 53 corresponds with direction 53A, 55 with SSA, 57 with 57A, and 59 with 59A. For cameras 53 and 57, small modules are utilized for each to allow them to fold out perpendicular to each of their respective segments. This is necessary to retain the compactness of the device when it's in the folded state. These same cameras could also instead be positioned along the edges of foldable computing device 11 such that they face the same direction shown in FIG. 1, but without having to be integrated with a fold out module.

Figure 2:
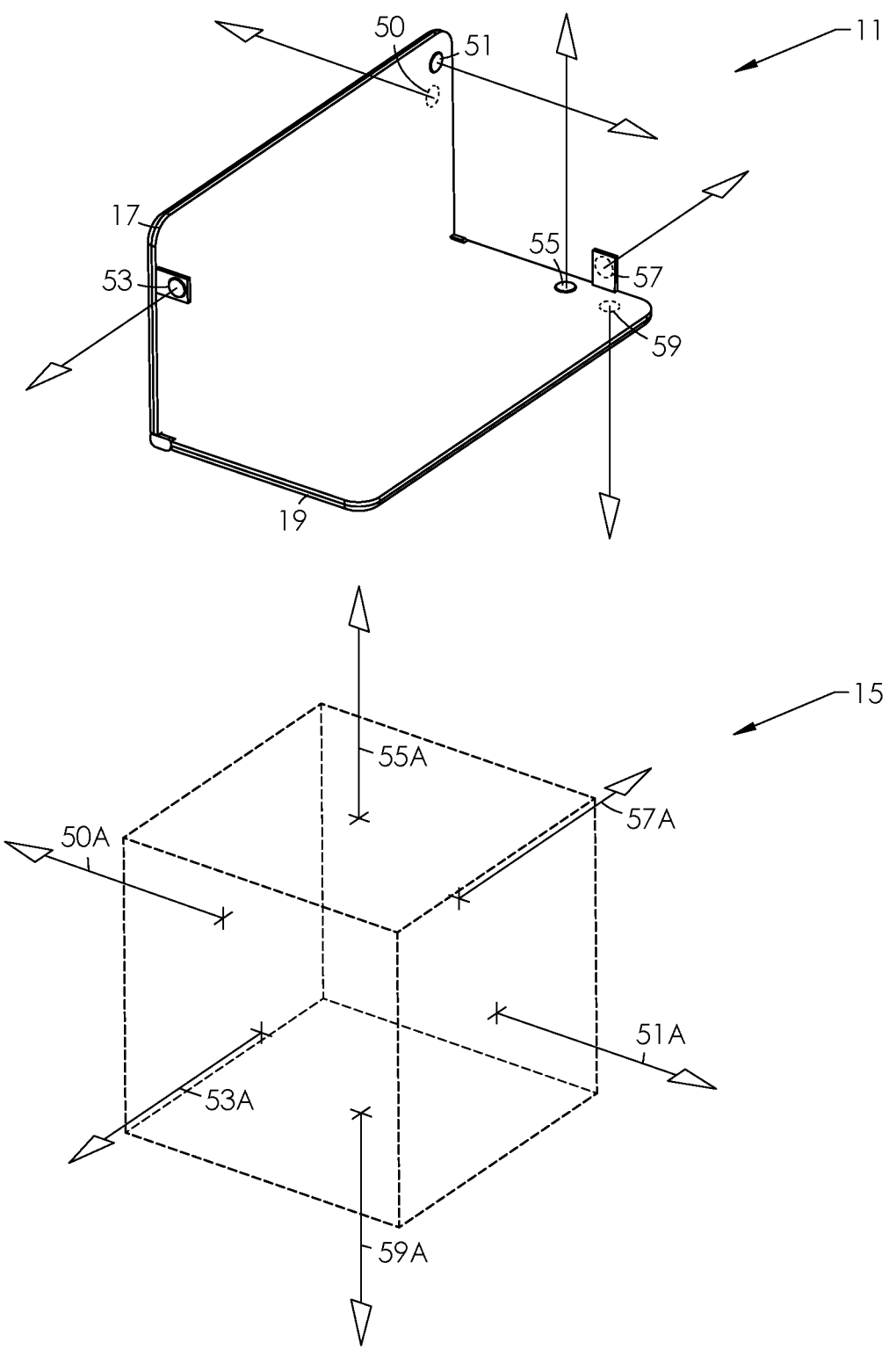
FIG. 2 is a perspective view of a foldable computing device shown in a configuration that is a variation of the embodiment shown in FIG. 1, where 6 cameras are also used to create a 360 degree camera with a reference to the 6 faces of a cube.

FIG. 2 is a perspective view of foldable computing device 11 shown in a configuration that is a variation of the embodiment shown in FIG. 1, where 6 cameras are also used to create a 360 degree camera with a reference to the 6 faces of a reference cube 15. The primary difference between FIG. 1 and FIG. 2 is the position of camera 53, which is pushed toward the opposite edge that it sits on in FIG. 1. This is simply to show that this configuration could also be implemented to potentially provide greater clearance for camera 53 and its viewing capacity.

Figure 3:
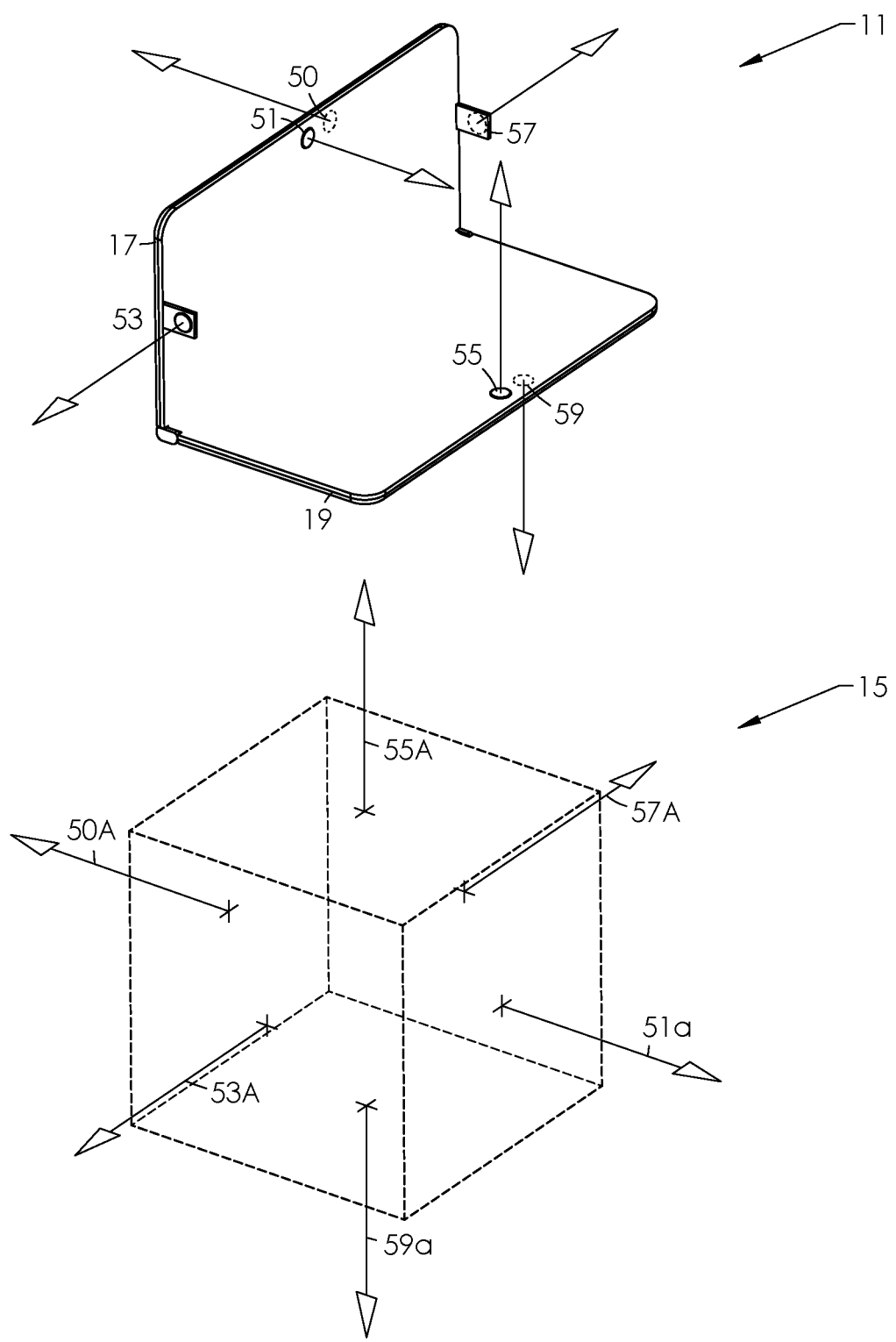
FIG. 3 is a perspective view of a foldable computing device shown in a configuration that is an additional variation of the embodiment shown in FIG. 1, where 6 cameras are also used to create a 360 degree camera with a reference to the 6 faces of a cube.

FIG. 3 is a perspective view of foldable computing device 11 shown in a configuration that is a variation of the embodiment shown in FIG. 1 and FIG. 2, where 6 cameras are also used to create a 360 degree camera with a reference to the 6 faces of a reference cube 15. The primary difference between FIG. 1 and FIG. 2 compared with FIG. 3 is the position of all 6 cameras 50, 51, 53, 55, 57, and 59 which are shifted closer to the center point for each direction that the cameras need to face in to correspond to reference cube 15 relative to the center point of the foldable computing device 11. This alternative camera configuration is simply to show a version that can potentially provide greater clearance for all camera positions and their viewing capacity.

Figure 4:
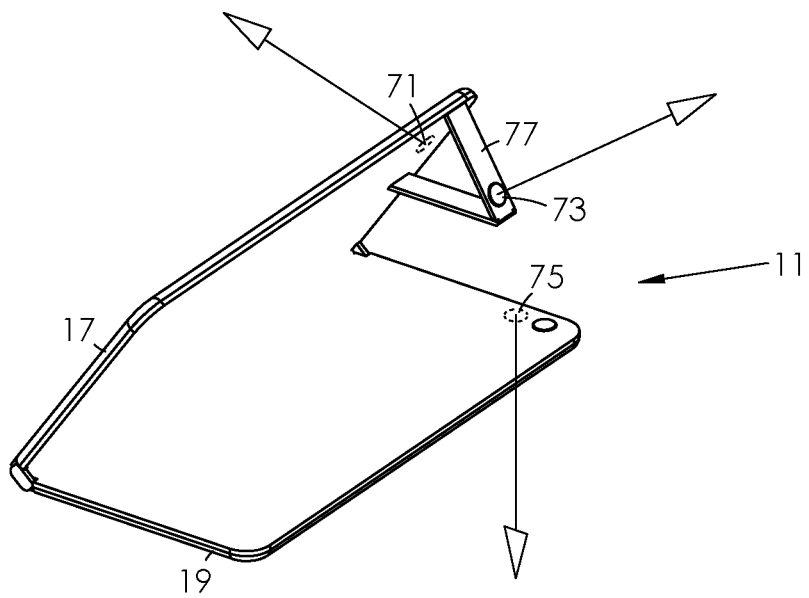
FIG. 4 is a perspective view of a foldable computing device shown in a configuration where 3 cameras are used to create a 360 degree camera with a reference to the 3 faces of an extruded triangle shape.
Figure 4:
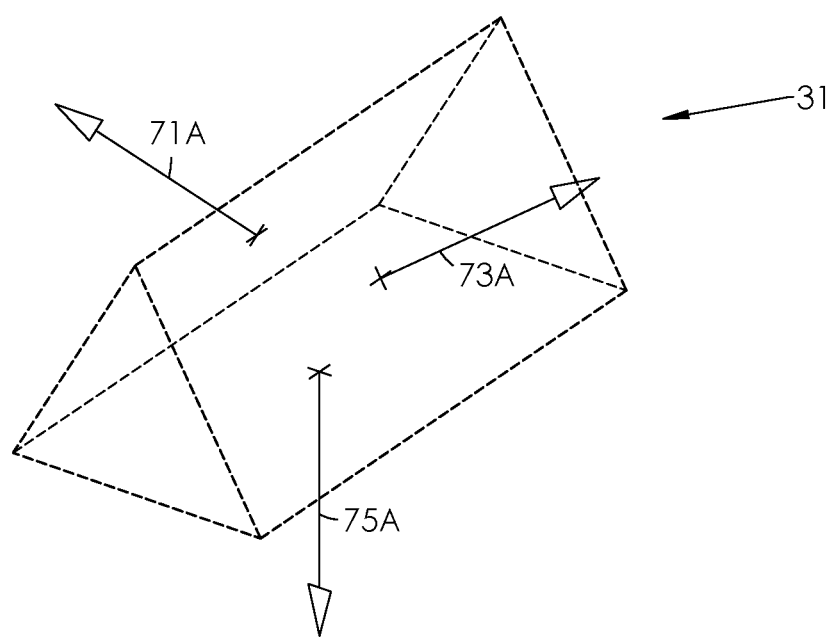

FIG. 4 is a perspective view of foldable computing device 11 shown in a configuration where 3 cameras 71, 73, and 75 are used to create a 360 degree camera with a reference to the 3 faces of an extruded triangle shape. In this embodiment segments 17 and 19 are folded partially to a 45 degree angle such that they can retain a triangular configuration in section. This allows the cameras to be utilized for a 360 degree image and video capture, but would require fish eye lenses, or the effect of fish eye lenses through software to achieve a fully spherical 360 degree view as the embodiments in FIG. 1, FIG. 2, and FIG. 3 do.

To achieve the direction needed for camera 73, a flip out module 77 that the camera 73 is coupled to, is utilized to allow camera 73 to sit at the appropriate angle such that the 360 degree configuration can be achieved. Additionally, image and video stitching software can be included directly with the device to facilitate stitching all the images and videos together that are taken from each camera.

The above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. An apparatus comprising:
   (a) a flexible touch-sensitive display composed of a first flexible touch-sensitive display portion and a second flexible touch-sensitive display portion; wherein:
       (1) the first flexible touch-sensitive display portion is attached to a first segment;
       (2) the second flexible touch-sensitive display portion is attached to a second segment;
       (3) the flexible touch-sensitive display further comprises having a fully folded state;
       (4) the flexible touch-sensitive display further comprises having a partially expanded state;
       (5) the flexible touch-sensitive display further comprises having a fully expanded state;
   (b) a plurality of cameras connected to the apparatus whereby at least one camera is integrated with the first segment, and at least one camera is integrated with the second segment; and at least one flip out camera is integrated on the first segment or the second segment such that the flip out camera is supported by two flip out module structures which are connected together at at least one end of each of the respective flip out module structures such that at least one of the two flip out module structures can rotate out from the edge of the apparatus to form a triangulated structure between the two flip out module structures that extends outward from the surface of the first segment or the second segment at an angle that positions the flip out camera into a triangulated formation with the at least one camera integrated with the first segment and the at least one camera integrated with the second segment; whereby the plurality of cameras can be used as a 360 degree camera.

2. The apparatus of claim 1 wherein:
   the plurality of cameras can be configured such that each camera is facing in a different direction.

3. The apparatus of claim 1 wherein:
   the plurality of cameras can be configured such that three cameras are integrated facing in three different directions with each situated 120 degrees From each other facing outward.

4. The apparatus of claim 1 wherein:
   the flip out camera is situated on a structure that can fold out from a back or front surface of the apparatus.

5. The apparatus of claim 1 wherein:
the fully folded state comprises a fully folded angle between the first flexible touch-sensitive display component and the second flexible touch-sensitive display component that is less than 10 degrees; and
the fully expanded state comprises a fully expanded angle between the first flexible touch-sensitive display component and the second flexible touch-sensitive display component that is between 170 and 190 degrees; and
the partially expanded state comprises an angle that falls between the fully folded state and the fully expanded state.

6. An apparatus comprising:
(a) a rigid touch-sensitive display;
(b) a flexible touch-sensitive display composed of a first flexible touch-sensitive display portion and a second flexible touch-sensitive display portion; wherein:
   (1) the first flexible touch-sensitive display portion is attached to a first segment;
   (2) the second flexible touch-sensitive display portion is attached to a second segment;
   (3) the flexible touch-sensitive display further comprises having a fully folded state;
   (4) the flexible touch-sensitive display further comprises having a partially expanded state;
   (5) the flexible touch-sensitive display further comprises having a fully expanded state;
(c) a plurality of cameras connected to the apparatus whereby at least one camera is integrated with the first segment, and at least one camera is integrated with the second segment; and at least one flip out camera is integrated on the first segment or the second segment such that the flip out camera is supported by two flip out module structures which are connected together at at least one end of each of the respective flip out module structures such that at least one of the two flip out module structures can rotate out from the edge of the apparatus to form a triangulated structure between the two flip out module structures that extends outward from the surface of the first segment or the second segment at an angle that positions the flip out camera into a triangulated formation with the at least one camera integrated with the first segment and the at least one camera integrated with the second segment; whereby the plurality of cameras can be used as a 360 degree camera.

7. The apparatus of claim 6 wherein:
the plurality of cameras can be configured such that each camera is facing in a different direction.

8. The apparatus of claim 6 wherein:
the plurality of cameras can be configured such that three cameras are integrated facing in three different directions with each situated 120 degrees From each other facing outward.

9. The apparatus of claim 6 wherein:
the flip out camera is situated on a structure that can fold out from a back or front surface of the apparatus.

10. The apparatus of claim 6 wherein:
the fully folded state comprises a fully folded angle between the first flexible touch-sensitive display component and the second flexible touch-sensitive display component that is less than 10 degrees; and
the fully expanded state comprises a fully expanded angle between the first flexible touch-sensitive display component and the second flexible touch-sensitive display component that is between 170 and 190 degrees; and
the partially expanded state comprises an angle that falls between the fully folded state and the fully expanded state.

* * * * *